(12) United States Patent
Bennett et al.

(10) Patent No.: US 9,067,811 B1
(45) Date of Patent: *Jun. 30, 2015

(54) SYSTEM, METHOD, AND CONTROL FOR GRAPHENOID DESALINATION

(75) Inventors: Rex G. Bennett, Haddon Township, NJ (US); John B. Stetson, New Hope, PA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 391 days.

This patent is subject to a terminal disclaimer.

(21) Appl. No.: 13/480,569

(22) Filed: May 25, 2012

(51) Int. Cl.
C02F 1/469 (2006.01)
C02F 1/461 (2006.01)

(52) U.S. Cl.
CPC ............... *C02F 1/4691* (2013.01); *C02F 1/469* (2013.01); *C02F 2001/46161* (2013.01)

(58) Field of Classification Search
CPC ................... C02F 1/4691; C02F 1/469; C02F 2001/46161
USPC .................. 204/518, 520, 627, 630, 638, 639
See application file for complete search history.

(56) References Cited

U.S. PATENT DOCUMENTS

| | | | |
|---|---|---|---|
| 4,935,207 A | 6/1990 | Stanbro et al. | |
| 5,425,858 A | 6/1995 | Farmer | |
| 5,636,437 A | 6/1997 | Kaschmitter et al. | |
| 5,679,232 A * | 10/1997 | Fedor et al. | 205/77 |
| 5,731,360 A | 3/1998 | Pekala et al. | |
| 5,902,762 A | 5/1999 | Mercuri et al. | |
| 5,932,185 A | 8/1999 | Pekala et al. | |
| 5,954,937 A | 9/1999 | Farmer | |
| 5,980,718 A | 11/1999 | Van Konynenburg et al. | |
| 6,309,532 B1 | 10/2001 | Tran et al. | |
| 6,346,187 B1 | 2/2002 | Tran et al. | |
| 6,462,935 B1 | 10/2002 | Shiue et al. | |

(Continued)

FOREIGN PATENT DOCUMENTS

| | | |
|---|---|---|
| KR | 102012002216 | * 3/2012 |
| WO | WO 2010115904 A1 | * 10/2010 |

(Continued)

OTHER PUBLICATIONS

Jiang et al. (Dec. 9, 2009) "Porous Graphene as the Ultimate Membrane for GasSeparation," Nano Letters. 9: pp. 4019-4024.*

(Continued)

*Primary Examiner* — Keith Hendricks
*Assistant Examiner* — Steven A. Friday
(74) *Attorney, Agent, or Firm* — Lathrop & Gage LLP

(57) ABSTRACT

A method is disclosed for deionizing water and purging ions. A first graphene sheet and a second graphene sheet are positioned between a water flow path input and output. A first electrical charge is applied to the first graphene sheet and a second electrical charge to the second graphene sheet, which causes the first graphene sheet to repel ions of the first electrical charge from transiting apertures in the first graphene sheet, influences ions of the second electrical charge from transiting the apertures in the first graphene sheet, and causes the second graphene sheet to repel ions of the second electrical charge from transiting the second apertures. Water is introduced into the water flow path input, through the first graphene sheet, and then through the second graphene sheet, resulting in deionized water at the output. A sensor monitors the capacitance of the graphene sheets to determine when purging is needed.

22 Claims, 13 Drawing Sheets

(56) References Cited

U.S. PATENT DOCUMENTS

| | | | |
|---|---|---|---|
| 6,580,598 B2 | 6/2003 | Shiue et al. | |
| 6,654,229 B2 | 11/2003 | Yanagisawa et al. | |
| 6,659,298 B2 | 12/2003 | Wong | |
| 6,661,643 B2 | 12/2003 | Shiue et al. | |
| 7,014,829 B2* | 3/2006 | Yanagisawa et al. | 423/447.1 |
| 7,071,406 B2 | 7/2006 | Smalley et al. | |
| 7,138,042 B2 | 11/2006 | Tran et al. | |
| 7,175,783 B2 | 2/2007 | Curran | |
| 7,267,753 B2 | 9/2007 | Anex et al. | |
| 7,382,601 B2 | 6/2008 | Yoshimitsu | |
| 7,459,121 B2 | 12/2008 | Liang et al. | |
| 7,505,250 B2 | 3/2009 | Cho et al. | |
| 7,600,567 B2 | 10/2009 | Christopher et al. | |
| 7,706,128 B2 | 4/2010 | Bourcier | |
| 7,761,809 B2 | 7/2010 | Bukovec et al. | |
| 8,147,599 B2* | 4/2012 | Mcalister | 96/154 |
| 8,361,321 B2* | 1/2013 | Stetson et al. | 210/652 |
| 2005/0189673 A1 | 9/2005 | Klug et al. | |
| 2006/0073370 A1 | 4/2006 | Krusic et al. | |
| 2006/0093885 A1 | 5/2006 | Krusic et al. | |
| 2008/0063585 A1 | 3/2008 | Smalley et al. | |
| 2008/0185293 A1* | 8/2008 | Klose et al. | 205/687 |
| 2008/0290020 A1 | 11/2008 | Marand et al. | |
| 2009/0291270 A1 | 11/2009 | Zettl et al. | |
| 2009/0294300 A1 | 12/2009 | Kanzius et al. | |
| 2010/0025330 A1 | 2/2010 | Ratto et al. | |
| 2010/0055464 A1 | 3/2010 | Sung | |
| 2010/0127312 A1 | 5/2010 | Grebel et al. | |
| 2010/0167551 A1 | 7/2010 | De Dontney | |
| 2010/0213079 A1 | 8/2010 | Willis | |
| 2010/0327847 A1 | 12/2010 | Leiber et al. | |
| 2012/0048804 A1 | 3/2012 | Stetson et al. | |
| 2012/0183738 A1 | 7/2012 | Zettl et al. | |
| 2012/0255899 A1* | 10/2012 | Choi et al. | 210/489 |
| 2013/0015136 A1* | 1/2013 | Bennett | 210/653 |
| 2013/0105417 A1* | 5/2013 | Stetson et al. | 210/806 |
| 2013/0240355 A1* | 9/2013 | Ho et al. | 204/451 |
| 2013/0248367 A1* | 9/2013 | Stetson et al. | 204/518 |
| 2013/0249147 A1* | 9/2013 | Bedworth, Peter V. | 264/483 |
| 2013/0256210 A1* | 10/2013 | Flemin, Shawn P. | 210/321.69 |
| 2013/0256211 A1* | 10/2013 | Flemin, Shawn P. | 210/321.76 |
| 2013/0277305 A1* | 10/2013 | Stetson et al. | 210/636 |
| 2014/0261999 A1* | 9/2014 | Stetson et al. | 156/247 |
| 2014/0263035 A1* | 9/2014 | Stoltenberg et al. | 210/500.25 |
| 2014/0263178 A1* | 9/2014 | Sinton et al. | 216/56 |
| 2014/0272286 A1* | 9/2014 | Stoltenberg et al. | 428/137 |
| 2014/0377738 A1* | 12/2014 | Bachmann et al. | 435/2 |
| 2015/0075667 A1* | 3/2015 | McHugh et al. | 138/140 |

FOREIGN PATENT DOCUMENTS

| | | | |
|---|---|---|---|
| WO | WO 2012006657 A1 * | 1/2012 | |
| WO | WO 2012030368 A1 * | 3/2012 | |

OTHER PUBLICATIONS

Karan et al. (Jan. 27, 2012) "Ultrafast Viscous Permeation of Organic Solvents Through Diamond-Like Carbon Nanosheets," Science. 335: pp. 444-447.*

Nair et al. (Jan. 27, 2012) "Unimpeded Permeation of Water Through Helium-Leak-tight Graphene-Based Membranes," Science. 335: pp. 442-443.*

Paul (Jan. 27, 2012) "Creating New Types of Carbon-Based Membranes," Science. 335: pp. 413-414.*

Suk et al. (Apr. 30, 2010) "Water Transport Through Ultrathin Graphene," Journal of Physical Chemistry Letters. 1(10): pp. 1590-1594.*

Liu, Li et al., "Graphene Oxidation: Thickness-Dependent Etching and Strong Chemical Doping"; Nano Letters 2008; vol. 8, No. 7, Jun. 9, 2008, pp. 1965-1970.

Kim, Myungwoong et al.;, "Fabrication and Characterization of Large-Area, Semiconducting Nanoperforated Graphene Materials"; Nano Letters 2010, vol. 10, No. 4, Mar. 1, 2010, pp. 1125-1131.

Bae, Sukang et al.; "Roll-to-roll production of 30-inch graphene films for transparent electrodes", Nature Nanotechnology; vol. 5, Jun. 20, 2010; pp. 574-578.

Morse, Jeff; "Review of Kim, Myungwoong et al.;, Fabrication and Characterization of Large-Area, Semiconducting Nanoperforated Graphene Materials"; InterNano Resources for Nanomanufacturing; Apr. 30, 2010.

Kyaw Sint, Boyang Wang, and Patr Kral, "Selective Ion Passage through Functionalized Graphene Nanopores"; JACS Communications, J. Am. Chem. Soc. 2008, 130, pp. 16448-16449; Nov. 14, 2008.

A. K. Mishra, S. Ramaprabhu, "Functionalized graphene sheets for arsenic removal and desalination of sea water", Desalination (2011), doi:10.1016/j.desal.2011.01.038, 7 pages.

* cited by examiner

Input AC signal with DC bias to maintain positive voltage differential between graphene sheets.

The change in the RC filter frequency response as the graphenoid filter capacitance increases with ion density The difference between the RC filter frequency response at initial electrical capacitance and final electrical capacitance

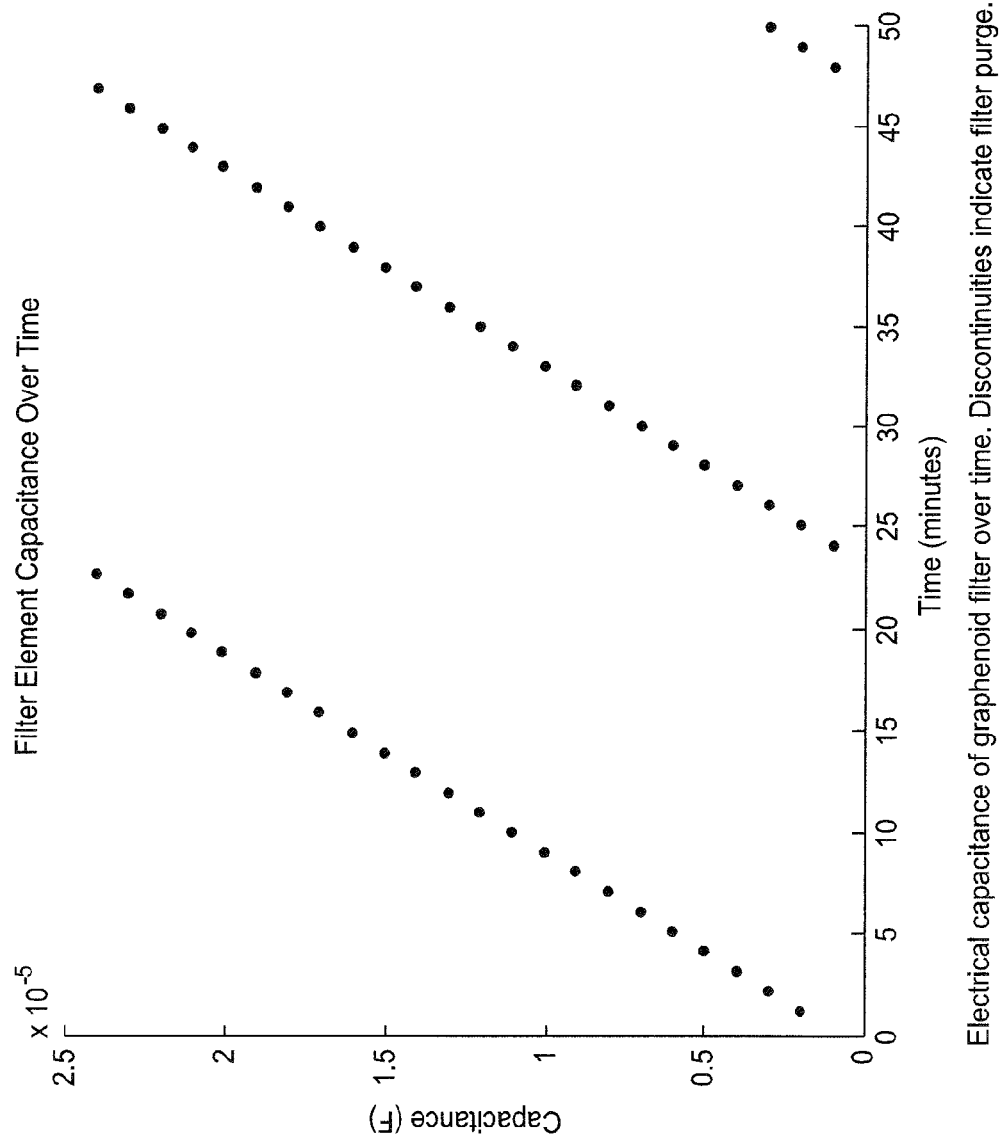

SYSTEM, METHOD, AND CONTROL FOR GRAPHENOID DESALINATION

FIELD OF THE INVENTION

The present invention relates generally to water filtration, and more particularly, to a system, method, and control for graphenoid desalination.

BACKGROUND OF THE INVENTION

As fresh water resources are becoming increasingly scarce, many nations are seeking solutions that can convert water that is contaminated with salt, most notably seawater, into clean drinking water.

Existing techniques for water desalination fall into four broad categories, namely distillation, ionic processes, membrane processes, and crystallization. The most efficient and most utilized of these techniques are multistage flash distillation (MSF), multiple effect evaporation (MEE) and reverse osmosis (RO). Cost is a driving factor for all of these processes, where energy and capital costs are both significant. Both RO and MSF/MEE technologies are thoroughly developed. Currently, the best desalination solutions require between two and four times the theoretical minimum energy limit established by simple evaporation of water, which is in the range of 3 to 7 kjoules/kg. Distillation desalination methods include multistage flash evaporation, multiple effect distillation, vapor compression, solar humidification, and geothermal desalination. These methods share a common approach, which is the changing of the state of water to perform desalination. These approaches use heat-transfer and/or vacuum pressure to vaporize saline water solutions. The water vapor is then condensed and collected as fresh water.

Ionic process desalination methods focus on chemical and electrical interactions with the ions within the solution. Examples of ionic process desalination methods include ion exchange, electro-dialysis, and capacitive deionization. Ion exchange introduces solid polymeric or mineral ion exchangers into the saline solution. The ion exchangers bind to the desired ions in solution so that they can be easily filtered out. Electro-dialysis is the process of using cation and anion selective membranes and voltage potential to create alternating channels of fresh water and brine solution. Capacitive deionization is the use of voltage potential to pull charged ions from solution, trapping the ions while allowing water molecules to pass.

Membrane desalination processes remove ions from solution using filtration and pressure. Reverse osmosis (RO) is a widely used desalination technology that applies pressure to a saline solution to overcome the osmotic pressure of the ion solution. The pressure pushes water molecules through a porous membrane into a fresh water compartment while ions are trapped, creating high concentration brine solution. Pressure is the driving cost factor for these approaches, as it is needed to overcome osmotic pressure to capture the fresh water. Crystallization desalination is based on the phenomenon that crystals form preferentially without included ions. By creating crystallized water, either as ice or as a methyl hydrate, pure water can be isolated from dissolved ions. In the case of simple freezing, water is cooled below its freezing point, thereby creating ice. The ice is then melted to form pure water. The methyl hydrate crystallization processed uses methane gas percolated though a saltwater solution to form methane hydrate, which occurs at a lower temperature than at which water freezes. The methyl hydrate rises, facilitating separation, and is then warmed for decomposition into methane and desalinated water. The desalinated water is collected, and methane is recycled.

Evaporation and condensation for desalination is generally considered to be energy efficient, but requires a source of concentrated heat. When performed in large scale, evaporation and condensation for desalination are generally co-located with power plants, and tend to be restricted in geographic distribution and size.

Capacitive deionization is not widely used, possibly because the capacitive electrodes tend to foul with removed salts and to require frequent service. The requisite voltage tends to depend upon the spacing of the plates and the rate of flow, and the voltage can be a hazard.

Reverse osmosis (RO) filters are widely used for water purification. The RO filter uses a porous or semipermeable membrane typically made from cellulose acetate or polyimide thin-film composite, typically with a thickness of 1 mm. These material are hydrophilic. The membrane is often spiral-wound into a tube-like form for convenient handling and membrane support. The membrane exhibits a random-size aperture distribution, in which the maximum-size aperture is small enough to allow transit of water molecules and to disallow or block the transit of ions such as salts dissolved in the water. Notwithstanding the one-millimeter thickness of a typical RO membrane, the inherent random structure of the RO membrane defines long and circuitous or tortuous paths for the water that flows through the membrane, and these paths may be much more than one millimeter in length. The length and random configuration of the paths require substantial pressure to strip the water molecules at the surface from the ions and then to move the water molecules through the membrane against the osmotic pressure. Thus, the RO filter tends to be energy inefficient.

FIG. 1 is a notional illustration of a cross-section of an RO membrane 10. In FIG. 1, membrane 10 defines an upstream surface 12 facing an upstream ionic aqueous solution 16 and a downstream surface 14. The ions that are illustrated on the upstream side are selected as being sodium (Na) with a +charge and chlorine (Cl) with a −charge. The sodium is illustrated as being associated with four solvating water molecules ($H_2O$). Each water molecule includes an oxygen atom and two hydrogen (H) atoms. One of the pathways 20 for the flow of water in RO membrane 10 of FIG. 1 is illustrated as extending from an aperture 20u on the upstream surface 12 to an aperture 20d on the downstream surface 14. Path 20 is illustrated as being convoluted, but it is not possible to show the actual tortuous nature of the typical path. Also, the path illustrated as 20 can be expected to be interconnected with multiple upstream apertures and multiple downstream apertures. The path(s) 20 through the RO membrane 10 are not only convoluted, but they may change with time as some of the apertures are blocked by unavoidable debris.

Alternative water desalination or deionization is desired and a method and system for monitoring ion build-up is desired.

SUMMARY OF THE INVENTION

A method for deionizing water carrying ions is disclosed that has lower energy and capital costs than the existing methods. The method comprises the steps of providing a first graphene sheet with first apertures dimensioned to allow flow of water molecules; providing a second graphene sheet with second apertures dimensioned to allow flow of water molecules; positioning the first graphene sheet downstream to a water flow path input and positioning the second graphene sheet between the first graphene sheet and a water flow path output. Then, a first electrical charge is applied to the first graphene sheet and a second electrical charge to the second graphene sheet, thereby causing the first graphene sheet to repel ions of the first electrical charge from transiting the first apertures, the non-transiting ions of a first electrical influencing ions of the second electrical charge to not transit the first apertures, and thereby causing the second graphene sheet to repel ions of the second electrical charge from transiting the second apertures. Water is caused to enter the water flow path input, through said first graphene sheet and then through said second graphene sheet, which results in first ions and second ions accumulating between the water flow path input and the first graphene sheet, second ions accumulating between the first graphene sheet and the second graphene sheet, and deionized water at the water flow path output.

The method may include applying a differential DC voltage across the first graphene sheet and the second graphene sheet to apply the first electrical charge and second electrical charge. Alternatively, the method may include applying an AC signal with a DC bias across the first graphene sheet and the second graphene sheet.

In the method for deionizing water, the first electrical charge may be a positive charge and the second electrical charge may be a negative charge. Alternatively, the first electrical charge may be a negative charge and the second electrical charge may be a positive charge.

The method for deionizing water may also comprise monitoring the ion density of the first graphene sheet and the second graphene sheet to determine when purging is needed. The method may include purging first ions and second ions when the ion density exceeds a threshold level. Purging may also include temporarily de-applying the first electrical charge on the first graphene sheet and the second electrical charge on the second graphene sheet during purging of the first ions and purging the second ions. The purging may also include collecting the purged first ions or collecting the purged second ions. Monitoring the ion density may comprise monitoring capacitance across the first graphene sheet and the second graphene sheet.

In an embodiment, the method for deionizing water may also comprise dimensioning the first apertures of the first graphene sheet to disallow transit of ions of the first electrical charge through the first apertures and dimensioning the second apertures of the second graphene sheet to disallow transit of ions of the second electrical charge through the second apertures.

A water deionizer is also disclosed. The water deionizing may comprise a first graphene sheet with first apertures dimensioned to allow the flow of water molecules; a second graphene sheet with second apertures dimensioned to allow the flow of water molecules; a water flow path having an input and an output, wherein the first graphene sheet is positioned downstream the water flow path input and the second graphene sheet is positioned between the first graphene sheet and the water flow path output; a source of water laden with ions; and a voltage source for applying a first electrical charge to the first graphene sheet and a second electrical charge to the second graphene sheet. The water laden with ions is introduced into the water flow path input flows to the first graphene sheet which repels ions of a first electrical charge from transiting the first apertures and attracts ions of a second electrical charge to transit the first apertures, then flows to the second graphene sheet which repels ions of a second electrical charge from transiting the second apertures, thereby resulting in first ions accumulating between the water flow path input and the first graphene sheet, second ions accumulating between the first graphene sheet and second graphene sheet, and deionized water at the water flow path output.

In the water deionizer, a differential DC voltage or an AC signal with a DC bias may be applied across the first graphene sheet and the second graphene sheet, thereby applying a first electrical charge to the first graphene sheet and a second electrical charge to the second graphene sheet. The first electrical charge may be a positive charge and the second electrical charge may be a negative charge. Alternatively, the first electrical charge may be a negative charge and the second electrical charge may be a positive charge.

The water deionizer may also include a resistor electrically coupled in series with the first graphene sheet and the second graphene sheet and a sensor for monitoring a voltage across the resistor, the voltage being indicative of an ion density on the first graphene sheet and the second graphene sheet. The water deionizer may also include a pump for purging the first ions and the second ions when the ion density exceeds a threshold level. The water deionizer may further include a processor electrically coupled to the sensor and the pump, wherein the processor causes the pump to purge the first ions and the second ions when the ion density of the first graphene sheet and second graphene sheet exceeds the threshold level. The water deionizer may also include an electrical relay electrically coupled to the processor and the voltage source, wherein the processor opens the electrical relay, thereby disconnecting the voltage source from the first graphene sheet and the second graphene sheet, during purging. The water deionizer may also include a first ion reclamation tank for receiving the purged first ions and a second ion reclamation tank for receiving purged second ions.

The water deionizer may also include an input valve on the water flow path input, an output valve on the water flow path output, a first pump valve coupling the pump to a first chamber between the water flow path input and the first graphene sheet, a second pump valve coupling the pump to a second chamber between the first graphene sheet and the second graphene sheet, a first ion reclamation tank valve and a second ion reclamation tank valve. To deionize water, the processor causes an actuator to open the input valve and the output valve and close the first pump valve, the second pump valve, the first ion reclamation tank valve, and the second ion reclamation tank valve. To purge the first chamber, the processor causes the actuator to close the input valve, the output valve, the second pump valve, and the second ion reclamation tank valve, and open the first pump valve and the first ion reclamation tank valve. To purge the second chamber, the processor causes the actuator to close the input valve, the output valve, the first pump valve, and the first ion reclamation tank valve, and open the second pump valve and the second ion reclamation tank valve.

The water deionizer may also include first apertures of the first graphene sheet that are further dimensioned to disallow transit of ions of a first electrical charge; and second apertures of the second graphene sheet that are further dimensioned to disallow transit of ions of a second electrical charge.

BRIEF DESCRIPTION OF THE DRAWINGS

FIG. 6E is a graph showing an embodiment of the electrical capacitance of the graphene sheets over time;

DETAILED DESCRIPTION

Figure 1:
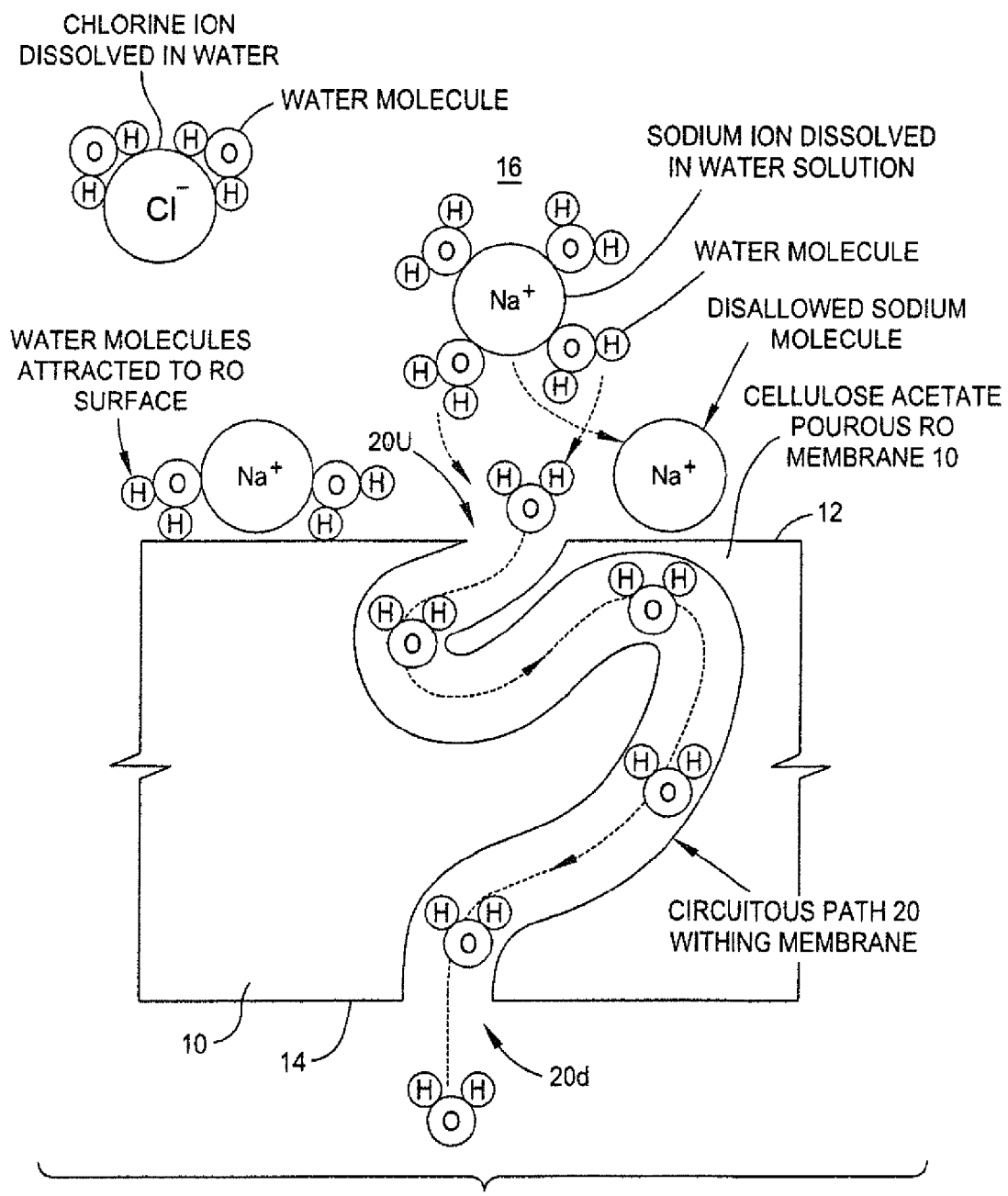
FIG. 1 is a notional cross-sectional representation of a prior-art reverse osmosis (RO) filter membrane.
Figure 2:
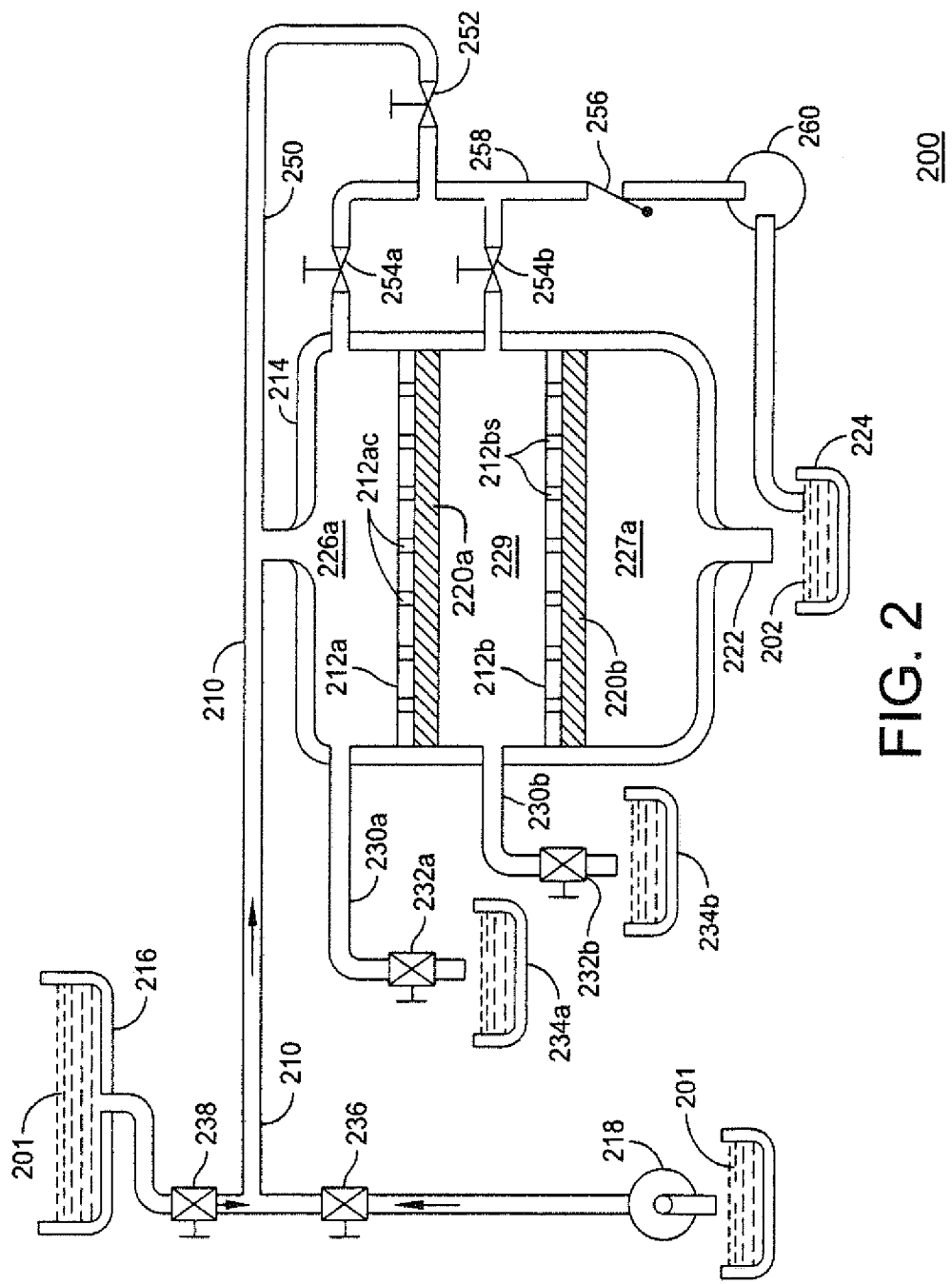
FIG. 2 is a notional representation of a water deionization filter according to aspects of the disclosure, using multiple perforated graphene sheets for separation of the concentrated ions.

FIG. 2 is a notional illustration of a deionization or desalination apparatus 200 (i.e., a water deionizer) according to another embodiment or aspect of the disclosure, in which multiple layers of electrically charged graphene sheets are used. In FIG. 2, an input channel 210 conveys ion-laden water to a filter membrane 212 mounted in a supporting chamber 214. The ion-laden water may be, for example, seawater or brackish water. In one exemplary embodiment, the filter membrane 212 can be wound into a spiral in a known manner. Flow impetus or pressure of the ion-laden water flowing through channel 210 of FIG. 2 can be provided either by gravity from a tank 216 or from a pump 218. Valves 236 and 238 allow selection of the source of ion-laden water and either can be considered a water flow path input valve.

Within support chamber 214 of FIG. 2, upstream and downstream perforated graphene sheets 212a and 212b, respectively, divide the chamber into three volumes or portions, namely an upstream portion or chamber 226a, a downstream portion or chamber 226b, and an intermediate portion or chamber 229. As used herein, the terms upstream and downstream convey the relation of parts of the apparatus in relation to other parts, in terms of the flow of the water in the apparatus, which is from the input channel 210 to the first graphene sheet 212a, then from the first graphene sheet 212a to the second graphene sheet 212b, and then from the second graphene sheet to the output channel 222. Thus, while perforated graphene sheet 212a is upstream in relation to the downstream graphene sheet 212b, perforated graphene sheet 212a is downstream in relation to the input channel 210. Notably, the term downstream is not intended to necessarily imply an elevation relationship between elements; that is, while the second graphene sheet 212b may be downstream from first graphene sheet 212a, that does not necessarily mean that second graphene sheet 212b is at a lower elevation than first graphene sheet 212a, though it may be. As will be understood, the apparatus may be pressurized so that a downstream element may be downstream in terms of flow but may be higher in elevation than an upstream element.

Figure 3:
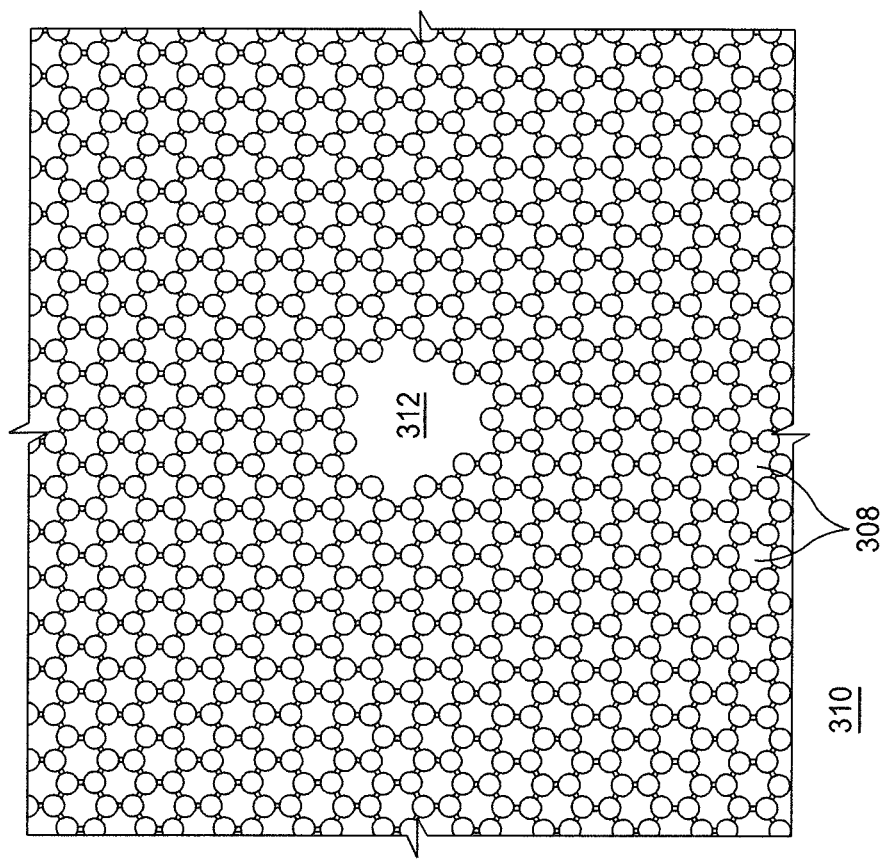
FIG. 3 is a plan representation of a perforated graphene sheet which may be used in the arrangement of FIG. 2, showing the shape of one of the plural apertures.

Each perforated graphene sheet 212a and 212b is associated with a backing sheet. More particularly, perforated graphene sheet 212a is backed by a sheet 220a, and perforated graphene sheet 212b is backed by a sheet 220b. Graphene is a single-atomic-layer-thick layer of carbon atoms, bound together to define a sheet 310, as illustrated in FIG. 3. The thickness of a single graphene sheet is approximately 2 nanometers (nm). Multiple graphene sheets can be formed, having greater thickness. The carbon atoms of the graphene sheet 310 of FIG. 3 define a repeating pattern of hexagonal ring structures (benzene rings) constructed of six carbon atoms, which form a honeycomb lattice of carbon atoms. An interstitial aperture 308 is formed by each six carbon atom ring structure in the sheet and this interstitial aperture is less than one nanometer across. This dimension is much too small to allow the transit of either water or ions.

Upstream graphene sheet 212a may be negatively charged, which may, under certain circumstances, repel chlorine ions from transiting the apertures 212ac. In an embodiment, chlorine ions, having a negative charge, may be repelled from passing through the negatively charged graphene sheet 212a, and therefore remain in the upstream portion or chamber 226a. However, as will be understood, the presence of the repelled chlorine ions on the input side of the sheet 212a will influence the sodium ions to also remain on the input side. In fact, separation of the chlorine and sodium ions would require a large amount of energy to be input into the system. Thus, by repelling the chlorine ions from transiting the graphene sheet, sodium ions are also effectively repelled from transiting the upstream graphene sheet.

There may be situations in which some of the sodium ions may nevertheless transit the apertures of the upstream graphene sheet. For example, if the graphene sheet is negatively charged and if the input solution has an excess of sodium ions in relation to chlorine ions, the excess sodium ions may be attracted to transit the apertures by the negative charge on the graphene sheet. In another example, the input solution may contain a third ion which is positively charged and which is not sodium, which may be attracted to transit through the upstream graphene sheet apertures. In these situations, it may be desirable to have a second graphene sheets to filter ions. In addition, it may be desirable to have a second graphene sheet to ensure a higher level of desalination.

Thus, the embodiment of FIG. 2 includes downstream graphene sheet 212b, which is positively charged and which is perforated with apertures 212bs (second apertures). The positive charge on the sheet repels the transit of sodium ions (or any other positive charged ion) through graphene sheet 212b. If sodium or other positive ions were able to transit through upstream sheet 212a into chamber 229, they are repelled from transiting through downstream positively charged perforated graphene sheet 212b, and so remain or accumulate in intermediate portion or chamber 229. In addition, to the extent that any chlorine ions were able to transit into chamber 229, those chlorine ions may be attracted to stay with the sodium ions in 229, and also will not transit through sheet 212b. Thus, water molecules ($H_2O$) substantially free of at least chlorine and sodium ions can flow from intermediate portion or chamber 229 through apertures 212bs of perforated graphene sheet 212b and into downstream portion or chamber 227a, from whence the deionized water can be collected through water flow path 222 and collection vessel 224. Water flow path 222 may be considered the water flow path output, and a valve (not shown) may be implemented as a water flow path output valve on the water flow path output 222. As will be understood, an alternate embodiment in which the upstream graphene sheet 212a has positively charged apertures and downstream graphene sheet 212b has negatively charged apertures will operate similarly. The charge may be applied to the graphene sheets by applying a differential DC voltage across the sheets or by applying an AC voltage with a DC bias (which could be positive or negative) across the sheets.

While it is anticipated that a single graphene sheet may, if properly "tuned," produce sufficiently deionized water, a two graphene sheet deionizer as shown in FIG. 2 provides an extra layer that may be capable of meeting the highest deionization standards. As will be understood, the second graphene sheet may alternatively be functionalized to repel different types of ions than the first graphene sheet. In addition, systems employing more than two graphene sheets may be used to ensure filtration of different types of ions and to ensure that the deionized water meets the highest standards. As discussed herein, the filtration may be performed by charging the sheets or by sizing apertures in the sheets for the filtration of specific ions. In a multi-sheet system having more than two graphene sheets, the different techniques of charging or aperture sizing may be used together.

Aperture 312 may be made by selective oxidation, by which is meant exposure to an oxidizing agent for a selected period of time. It is believed that the aperture 312 can also be laser-drilled. As described in the publication Nano Lett. 2008, Vol. 8, no. 7, pg 1965-1970, the most straightforward perforation strategy is to treat the graphene film with dilute oxygen in argon at elevated temperature. As described therein, through apertures or holes in the 20 to 180 nm range were etched in graphene using 350 mTorr of oxygen in 1 atmosphere (atm) argon at 500° C. for 2 hours. The paper reasonably suggests that the number of holes is related to defects in the graphene sheet and the size of the holes is related to the residence time. This is believed to be the preferred method for making the desired perforations in graphene structures. The structures may be graphene nanoplatelets and graphene nanoribbons. Thus, apertures in the desired range can be formed by shorter oxidation times. Another more involved method utilizes a self assembling polymer that creates a mask suitable for patterning using reactive ion etching. A P(S-blockMMA) block copolymer forms an array of PMMA columns that form vias for the RIE upon redeveloping. The pattern of holes is very dense. The number and size of holes is controlled by the molecular weight of the PMMA block and the weight fraction of the PMMA in the P(S-MMA). Either method has the potential to produce perforated graphene sheets.

As mentioned, the graphene sheet 310 of FIG. 3 has a thickness of but a single atom. Thus, the sheet tends to be flexible. The flex of the graphene sheet can be ameliorated by applying a backing structure to the sheet 212. In FIG. 2, the backing structure of perforated graphene sheets 212a and 212b is illustrated as 220a and 220b, respectively. Backing structure 220a and 220b in this embodiment are each a sheet of perforated polytetrafluoroethylene, sometimes known as polytetrafluoroethane. A thickness of the backing sheet may be, for example, one millimeter (mm).

It should be noted that, in the apparatus or arrangement of FIG. 2, the pressure of ion-laden water applied through water flow path 210 to the perforated membranes 212a and 212b can be provided by gravity from tank 216, thereby emphasizing one of the aspects of the apparatus 200. That is, unlike the RO membrane, the perforated graphene sheet 312 forming the perforated membrane 212 is hydrophobic, and the water passing through the pierced apertures (312 of FIG. 3) is not impeded by the attractive forces attributable to wetting. Also, as mentioned, the length of the flow path through the apertures 312 in graphene sheet 310 is equal to the thickness of the sheet, which is about 2 nm. This length is much less than the lengths of the random paths extending through a RO membrane. Consequently, little pressure is required to provide fluid flow, or conversely, the flow at a given pressure is much greater in the perforated graphene sheet 310. This, in turn, translates to a low energy requirement for deionization. It is believed that the pressure required in a RO membrane to force water through the membrane against osmotic pressure includes a frictional component which results in heating of the membrane. Consequently, some of the pressure which must be applied to the RO membrane does not go toward overcoming osmotic pressure, but instead goes into heat. Simulated results show that the perforated graphene sheet reduces the required pressure by at least a factor of five.

As described, the graphene sheets 212a and 212b of FIG. 2 may be charged to effectively repel ions from transiting the graphene sheet. Consequently, any ions that are not expected to pass through graphene sheet can be expected to accumulate. This accumulation of ions is referred to herein as "condensate," and will eventually reduce the flow of water through the perforated graphene sheets 212a and 212b, thereby tending to render it ineffective for deionization. More particularly, with a flow of water laden with chlorine and sodium ions, upstream portion or chamber 226a of apparatus 200 may accumulate a condensate concentration consisting of chlorine and sodium ions, and intermediate portion or chamber 229 may accumulate a concentration principally of sodium ions.

Figure 4:
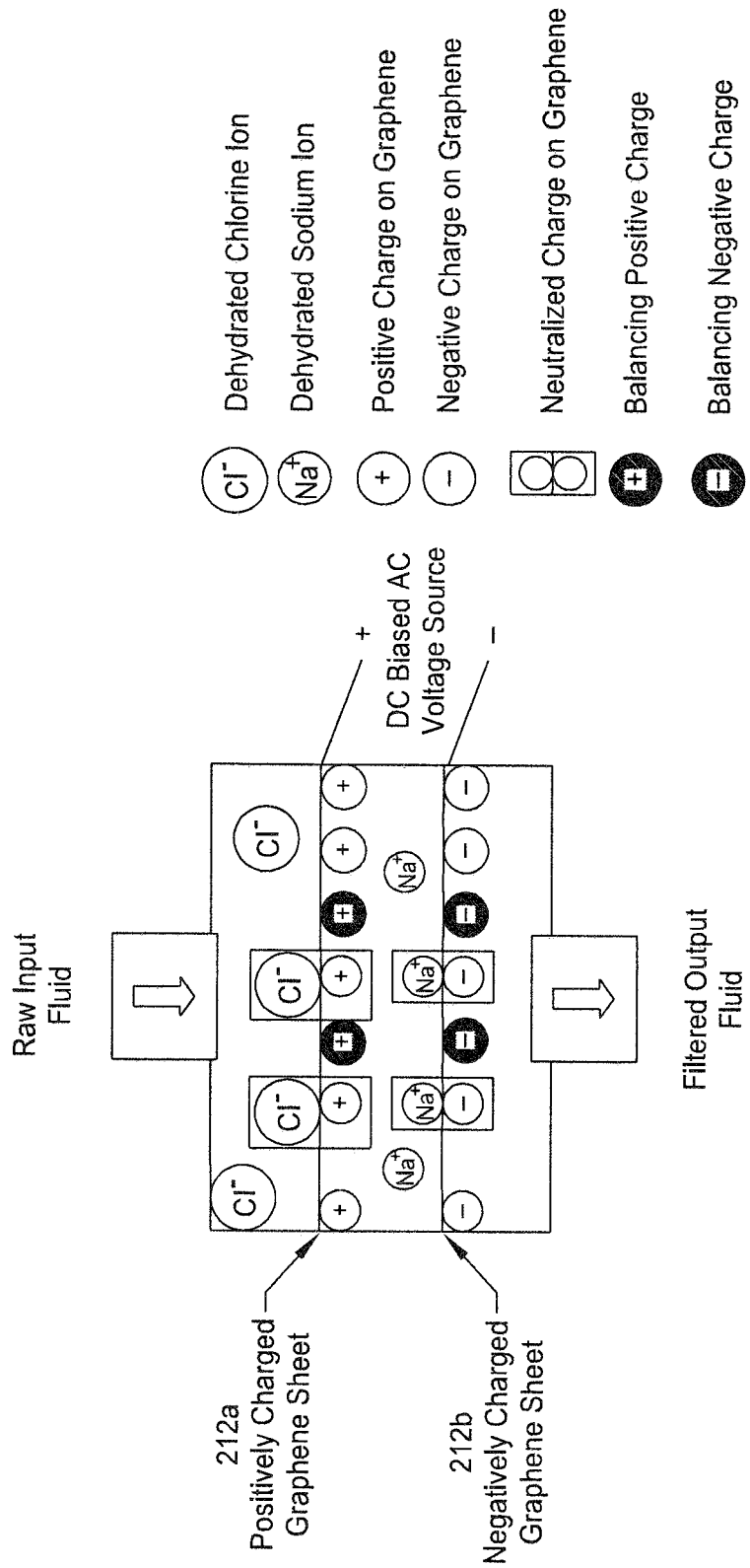
FIG. 4 is a notional representation of the ion physics of the graphene sheets.

Notably, as the graphene sheets filter ions from the water, the gross charge on the graphene sheets may increase but the net charge does not as balancing charges attach to the sheets. As shown on FIG. 4, the first and second graphene sheets 212a may accumulate ions on the sheets. In particular, in an embodiment in which a positive charge is applied to the first sheet 212a, negative ions (such as chlorine ions) may accumulate on the first graphene sheet on the input side of the sheet. Positive ions (e.g., balancing positive charges) from the external voltage source connected to the first graphene sheet may correspondingly accumulate on the first sheet as shown in FIG. 4, to keep the net charge of sheet 212a the same as the negative chlorine ions accumulate on the sheet. Similarly, positive ions (such as sodium ions that were able to transit the first graphene sheet) may accumulate on the negatively charged second graphene sheet 212b on the intermediate chamber 229 side of the sheet. Negative ions (e.g., balancing negative charges) from the external voltage source connected to the second graphene sheet may correspondingly accumulate on the output side of the second sheet to keep the net charge of sheet 212b the same. Thus, in the embodiment of FIG. 4, the positively charged first sheet 212a will attract negatively charged chlorine ions and positive balancing charges from the external voltage source will correspondingly accumulate on the sheet, thus increasing the gross charge on the sheet but keeping the same relative net charge on the sheet. Likewise, in the embodiment of FIG. 4, the negatively charged second sheet 212b will attract positively charged sodium ions and negative balancing charges from the external voltage source will correspondingly accumulate on the sheet, which results in an increase in the gross charge on the sheet but not the net charge on the sheet. As will be understood, because the gross charges on the sheets increase when ions attach to the sheets, the gross charge on the sheets is indicative of the amount of condensate on the sheets and a system or method that can monitor that gross charge can be used to determine when purging of the ions on the sheets is needed. The net charge of the sheets will be the same as before the introductions of the ions because positive and negative balancing charges from the external voltage source will accumulate to keep the net charge the same.

The concentrated ions in chambers 226a and 229 and the ions on the graphene sheets 212a and 212b can be separately extracted by selective control of purging connections 230a and 230b and their purge valves 232a and 232b, respectively. In an embodiment, removing the voltage from the graphene sheets releases the bond between the ions on the sheets, making the ions free to flow when purging is performed. More particularly, valve 232a can be opened to allow the concentrated ions to flow from upstream portion or chamber 226a to a collecting vessel illustrated as a tank 234a (ion reclamation tank), and valve 232b can be opened to allow the concentrated ions to flow from intermediate portion or chamber 229 to a collecting vessel illustrated as a tank 234b (ion reclamation tank). Ideally, purge valve 232a is closed before purging of intermediate portion or tank 229 is begun, so that some pressure is maintained across perforated graphene sheet 212a to provide a flow of water through perforated graphene sheet 212a to aid in flushing the condensate from the intermediate chamber 229. Purge valves 232a and 232b are closed prior to proceeding with the deionization. The purged and collected concentrated ions may have economic value, as for conversion into solid form in the case of sodium or gaseous form in the case of chlorine. In addition, the purged and collected ions may be used as part of an energy production system because the separation of sodium and chlorine ions creates chemical potential energy. It should be noted that sea water contains significant amounts of beryllium salts, and these salts, if preferentially concentrated, have value to the pharmaceutical industry as a catalyst. As will be understood, in an alternate embodiment in which the upstream graphene sheet 212a is positively charged and downstream graphene sheet 212b is negatively, both sodium and chlorine ions will accumulate in the upstream chamber 226a and principally chlorine ions will accumulate in the intermediate chamber 229. Those accumulated ions can be purged as described above.

Also illustrated in FIG. 2 are cross-flow valves 254a and 254b, communicating between a flow path 258 and upstream portion or chamber 226a and intermediate portion or chamber 226b, respectively. Unfiltered water 201 loaded with ions (a source of water laden with ions) can be routed to flow path 258 by opening valve 252, or deionized water 202 can be provided from tank 224 by operating a pump 260. From pump 260, the deionized water flows through a check valve 256 to path 258. Cross-flow valves 254a and 254b (also known as the pump valves when water from tank 224 is used for purging) are opened and closed simultaneously with purge valves 232a and 232b, respectively, to thereby aid in purging the condensate from the chambers.

Figure 5:
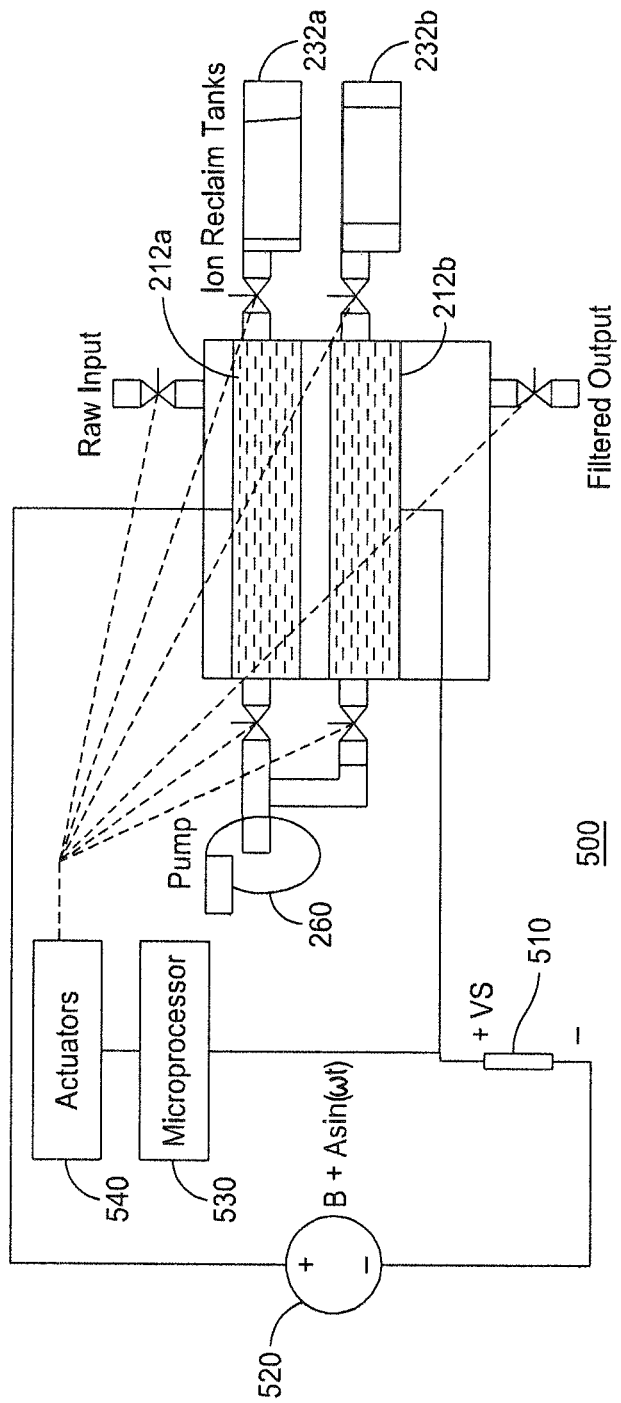
FIG. 5 is a simplified diagram illustrating an embodiment of a processor controller for monitoring the accumulation of ions on the graphene sheets.
Figure 6A:
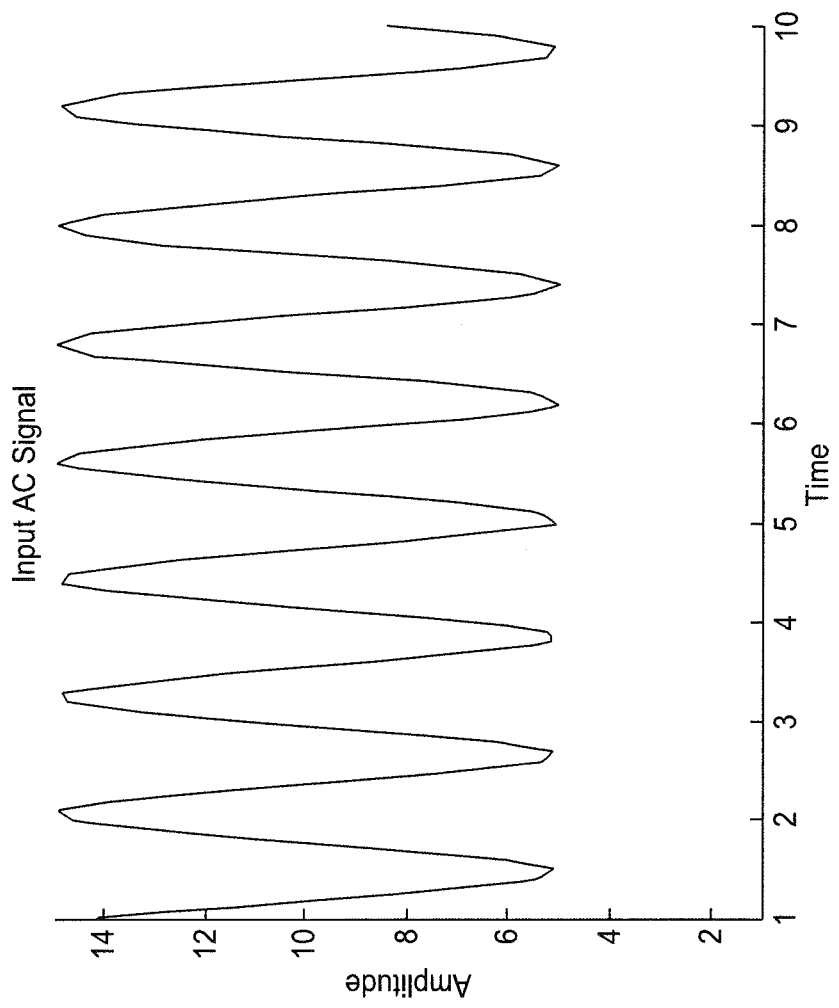
FIG. 6A is a graph showing an embodiment of an input AC signal which may be used to charge graphene sheets.

FIG. 5 is an illustration of a control system that may be used to monitor the amount of condensate accumulated on the first graphene sheet 212a and the second graphene sheet 212b. The condensate accumulated on the sheets will also be indicative of the condensate within the chambers 226a and 229 of the chamber 214, and the control system may also be used to cause purging of the condensate in the chambers and on the sheets so that efficiency of the deionization process can be maintained. Graphene is conductive, and as such, the two graphene sheets 212a and 212b act as a parallel plate capacitor when they are charged. When the graphene sheets are connected in series with a resistor 510, the graphene sheets and the resistor 510 form a passive RC filter in which the output across the resistor VS is the output of a high-pass RC filter. In an embodiment, a sinusoidal voltage source 520 is applied as an input signal to the RC filter formed by the graphene sheets and the resistor. The AC signal may include a DC voltage bias such that the voltage across the graphene sheets is always positive, resulting in a positive voltage differential across the graphene sheets. A graph of an exemplary Input AC signal with DC Bias is shown in FIG. 6A.

Figure 6B:
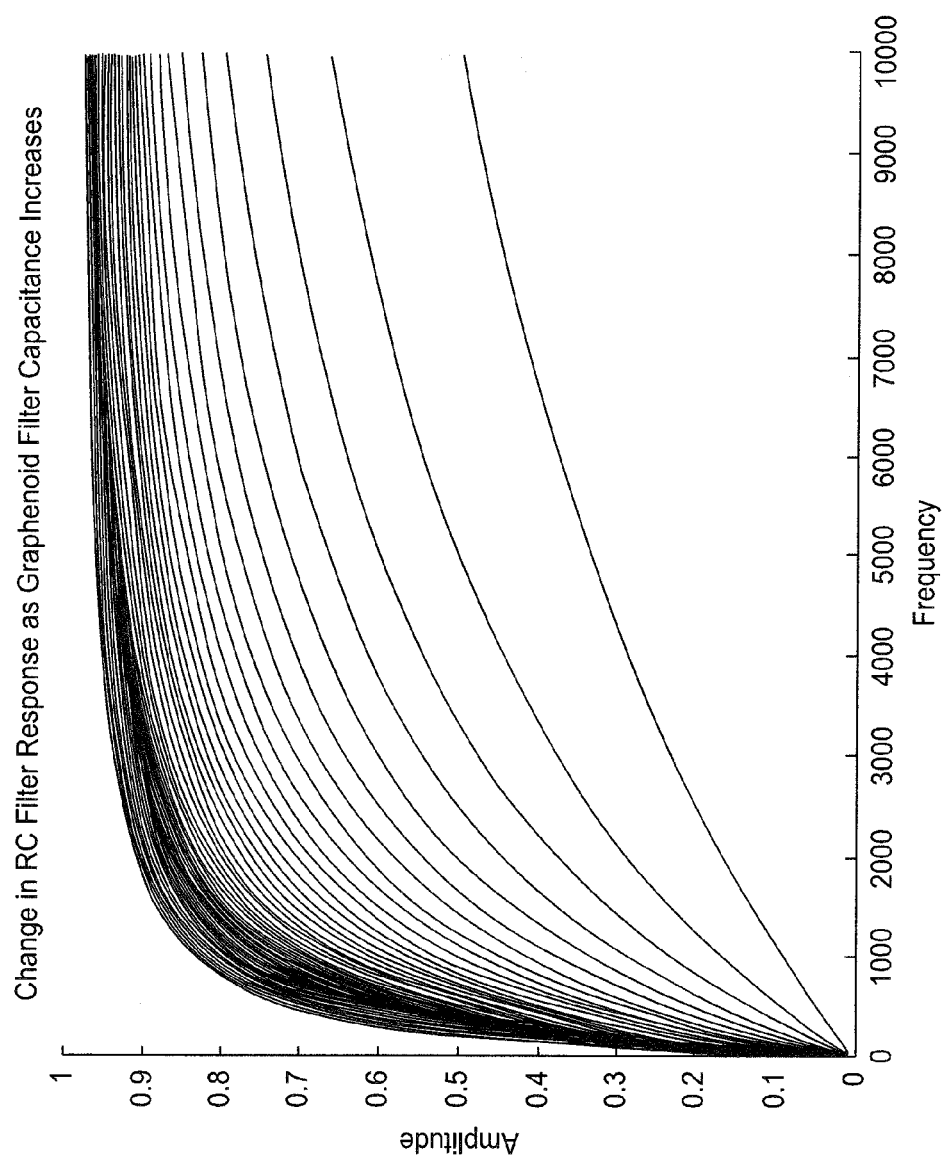
FIG. 6B is a graph showing an embodiment of the change in RC filter frequency response as the capacitance of the graphene sheets increases.
Figure 6C:
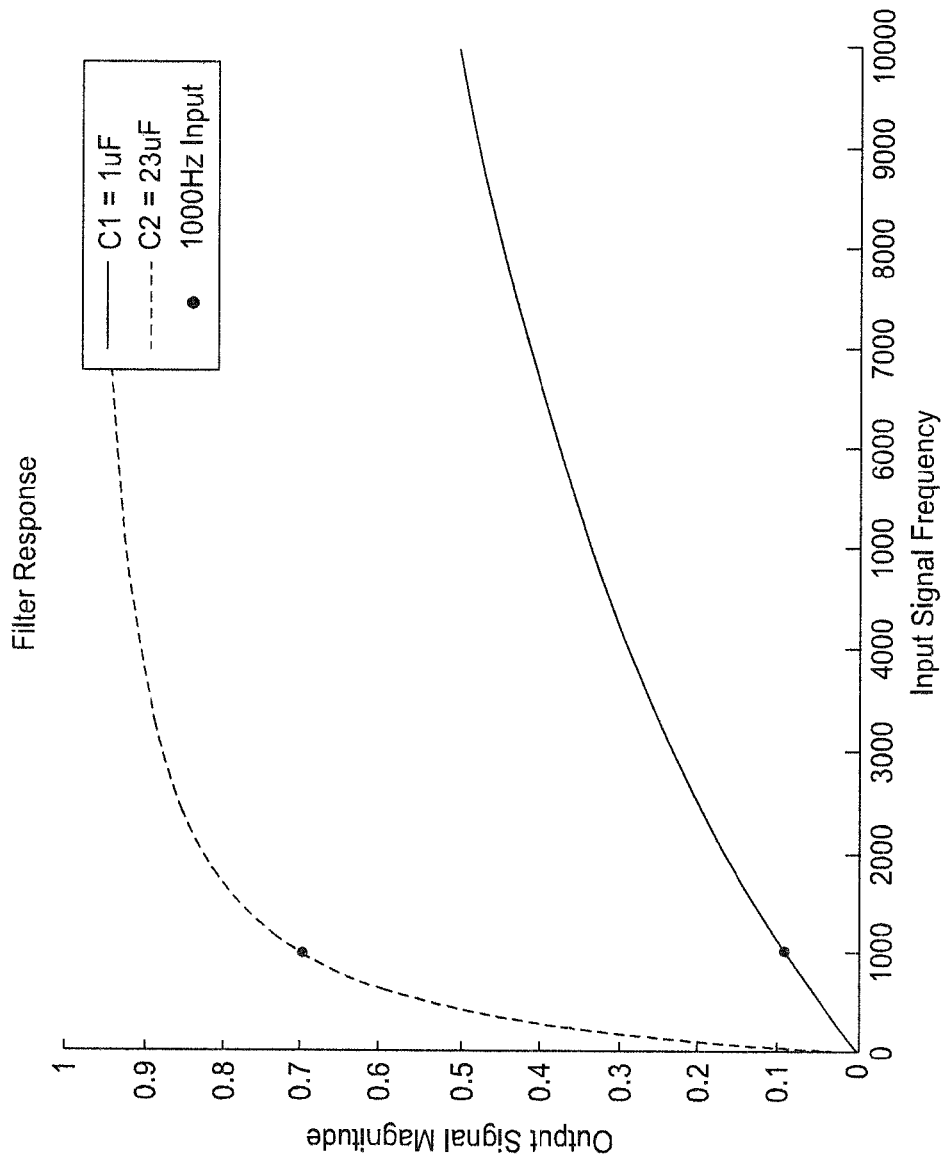
FIG. 6C is a graph showing an embodiment of the difference between RC filter frequency response at initial electrical capacitance of the graphene sheets and final electrical capacitance of the graphene sheets.
Figure 6D:
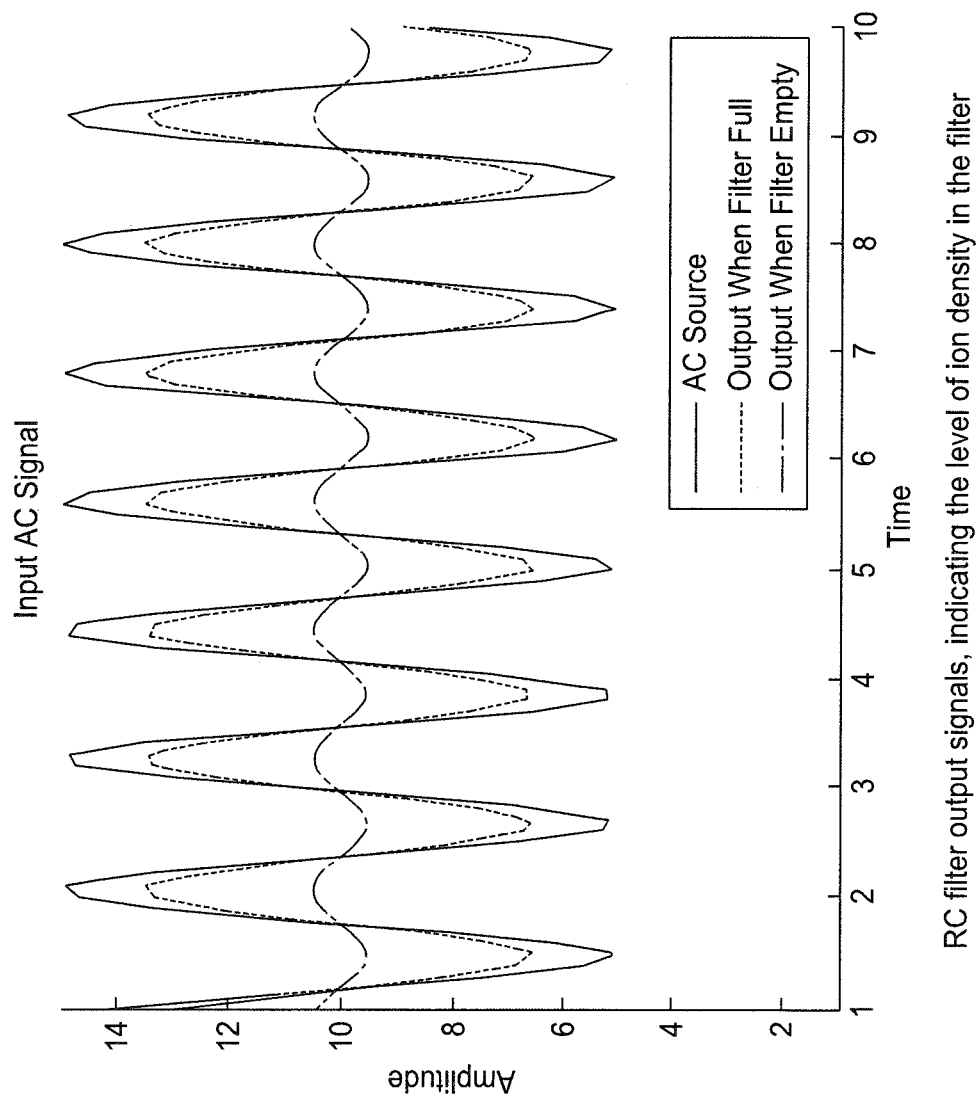
FIG. 6D is a graph showing an embodiment of the RC filter output signals.

The amount of condensate on the graphene sheets may be monitored by monitoring the frequency response of the RL circuit formed by the resistor and the parallel plate capacitor formed by the graphene sheets. Voltage across a capacitor (V) is proportional to charge (q) in accordance with q=CV. The DC bias of the AC voltage source replenishes the neutralized charge and balances the net charge on the graphene sheets. The gross charge on the sheets increases, but the net charge remains the same due to charge balancing, the accumulation of balance charges on the sheets as discussed above. As a result, trapped ions effectively increase the electrical capacitance (C) of the graphene sheets. In an embodiment, the frequency of the AC input signal to the resistor and graphene sheets is set such that for the initial filter element electrical capacitance $C_1$ the input AC signal frequency ω is less than the RC cutoff frequency $ω_{C1}=1/RC_1$ and the signal does not pass through the RC filter. During filtering, ions accumulate on the graphene sheets and the electrical capacitance increases to $C_2$ and the cutoff frequency of the RC filter decreases to $ω_{C2}=1/RC_2$. The cutoff frequency decreases to $ω_{C2}$, and becomes lower than the input signal frequency ω, resulting in the AC input signal passing through the RC filter. FIG. 6B is a graph showing the change in the RC filter frequency response as the ion density (and hence capacitance) increases on the graphene filters. FIG. 6C is a graph showing the difference in RC filter frequency response at initial electrical capacitance $C_1$ and at final electrical capacitance $C_2$. Accordingly, as reflected in the graphs of FIGS. 6D and 6E, the magnitude of the output signal amplitude is reflective of the electrical capacitance of the graphene sheets, and the electrical capacitance is proportional to the ion density on the sheets. Specifically, FIG. 6D shows the RC filter output signals, which indicate the level of ion density in the filter, and FIG. 6E shows the electrical capacitance of the graphenoid filter over time, where the shown discontinuities indicate where the filter was purged. Thus, the ion density can be monitored by monitoring the electrical capacitance across the sheets, which may be monitored by monitoring the output electrical signal on the resistor with an appropriate sensor as known in the art. Purging of ions from the graphene sheets can be performed (such as when ion density reaches a predetermined threshold level at which efficiency is unacceptable) as needed to maintain efficiency of the deionization process.

In an embodiment, monitoring the capacitance of the graphene sheets is indirectly performed by monitoring the output voltage on the resistor of the RC filter, and control of the purging operations is performed by a processor 530. As shown in FIG. 5, the processor 530 is electrically coupled to the resistor 510 and graphene sheets so that it can monitor the voltage output of the RC filter formed by those elements. The processor 530 is also electrically coupled to the actuators 540 of the valves and pump (or pumps) so that it control the process of deionizing solution and then purging ions when needed. In an embodiment, the reclamation tanks 236A and 236B are configured so that opening of the purge valves 232a and 232b causes the ions to flow to the reclamation tanks by force of gravity. That is, the respective reclamation tanks are at an elevation lower than the respective chambers they service. As described earlier, the chambers are purged separately (i.e., not at the same time) to maintain pressure within the chamber. In another embodiment, a pump may be used to cause the collected ions to be purged to their respective tanks. In this embodiment, the processor causes pump 260 to activate, and pump 260 causes deionized water to flow through a check valve 236 to path 258. The processor causes cross-flow valves 256A and 256B to be opened and closed simultaneously with purge valves 232a and 232b, respectively, to thereby aid in purging the condensate from the chambers. The processor 530 may also trigger an electrical relay (not shown) to break the connection between the AC source signal and the RC filter (resistor and graphene sheets), thereby disconnecting the voltage source from the graphene sheets and thereby releasing the bond between the ions to the sheets, making the ions free to flow when purging is performed.

With regard to the perforated graphene sheets 212 of FIG. 2, FIG. 3 illustrates a graphene sheet with a perforation (also termed an aperture). A representative generally or nominally round aperture 312 is defined through the graphene sheet 310. Aperture 312 may have a diameter selected that could theoretically allow all ions within a solution to pass.

Figure 7:
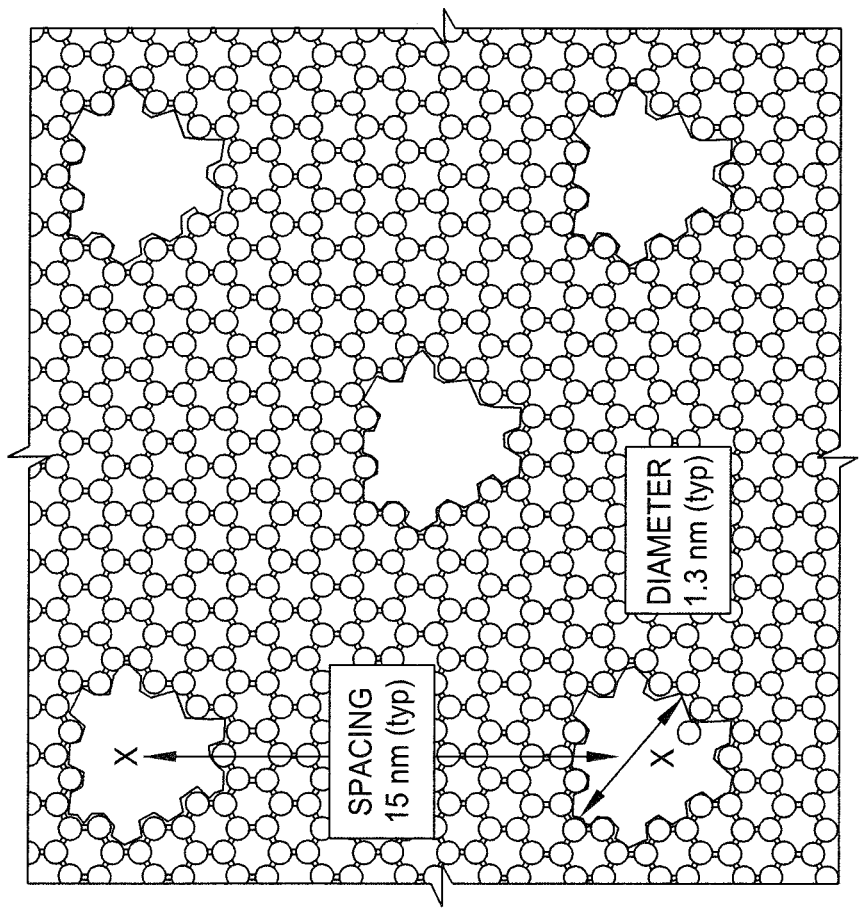
FIG. 7 is a plan view of a perforated graphene sheet, showing 1.3 nanometer diameter perforations or apertures and interperforation dimensions.
Figure 8:
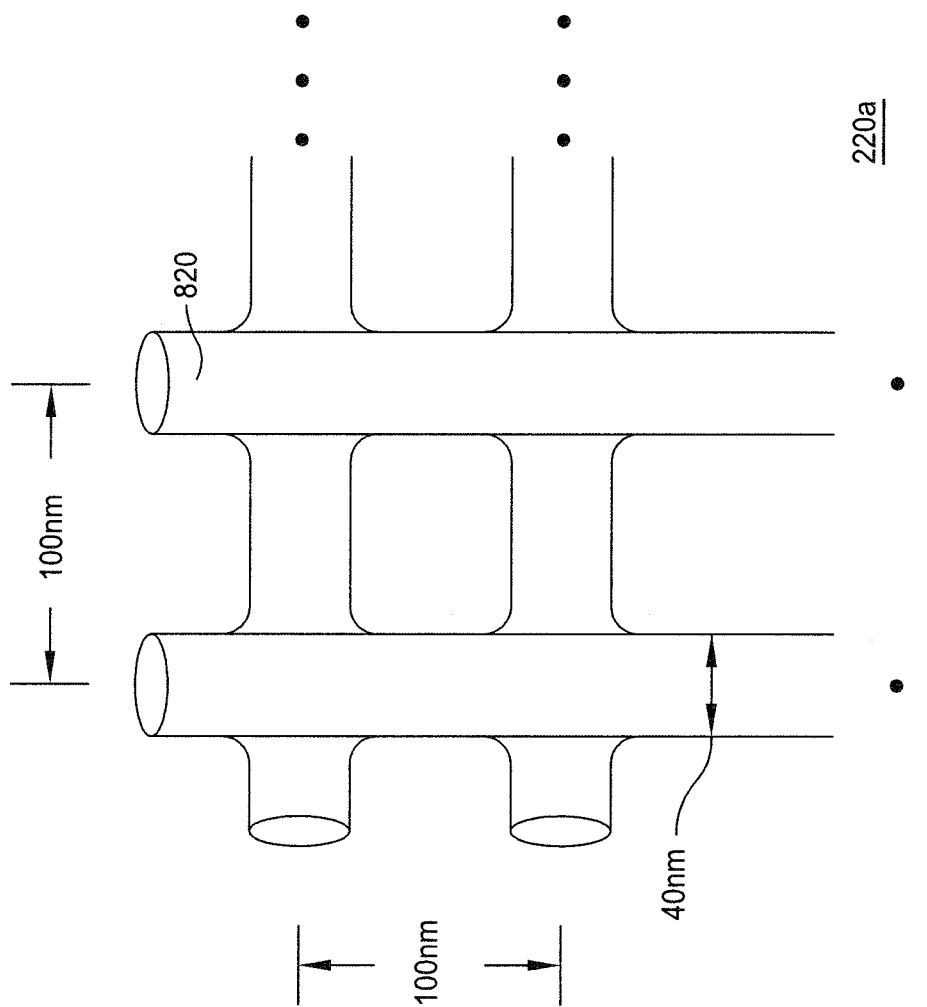
FIG. 8 is a plan representation of a backing sheet that may be used in conjunction with the perforated graphene sheet of FIG. 2.

FIG. 7 is a representation of a graphene sheet with a plurality of perforations such as that of FIG. 3. The sheet of FIG. 7 defines five apertures. In principle, the flow rate will be proportional to the aperture density. As the aperture density increases, the flow through the apertures may become "turbulent," which may adversely affect the flow at a given pressure. Also, as the aperture density increases, the strength of the underlying graphene sheet may be locally reduced. Such a reduction in strength may, under some circumstances, result in rupture of the membrane. The center-to-center spacing between apertures is believed to be near optimum for the 1.3 nanometer apertures at a value of fifteen nanometers In an embodiment, the size of the perforations on graphene sheets 212a and 212b differ in size so that one sheet effectively disallows the flow of water laden with chlorine and one sheet effectively disallows the flow of water laden with sodium. In an embodiment including perforations of different size as well as positive and negative charging of the sheets, deionization is effected both by the physical apertures and the charges on the apertures. With respect to the embodiment with differing perforation sizes, upstream graphene sheet 212a is perforated by apertures 212ac selected to disallow or disable the flow of chlorine ions and to enable the flow of water laden with sodium ions; these apertures are 1.3-2 nanometers in nominal diameter. Thus, chlorine ions cannot pass through perforated graphene sheet 212a, but remain in the upstream portion or chamber 226a. Water laden with sodium ions is able to flow through perforated graphene sheet 212a into intermediate chamber 229, though as discussed herein, the sodium ions are influenced to stay in the upper chamber with the repelled chlorine ions. However, in the event that either sodium, chlorine, or other ions are able to pass through sheet 212a, downstream graphene sheet 212b is able to filter those ions. Downstream perforated graphene sheet 212b is perforated with apertures 612bs selected to disallow or disable the flow of sodium ions and to enable the flow of water molecules; these apertures are 1.3 nanometers in nominal diameter. Sodium ions cannot pass through downstream perforated graphene sheet 212b, and so remain or accumulate in intermediate portion or chamber 229. In addition, other positive ions are repelled from transiting the sheet because of the charge on the sheet, and any negative ions are influenced to not transit the sheet because they are inclined to stay with the repelled positive ions. Thus, water molecules ($H_2O$), substantially free of at least chlorine and sodium ions, can flow from intermediate portion or chamber 229 through apertures 212bs of perforated graphene sheet 212b and into downstream portion or chamber 227a, from whence the deionized water can be collected through path 222 and collection vessel 224. As will be understood, an embodiment in which the apertures in the upstream graphene sheet are larger than the apertures in the downstream graphene sheet (as described above) allows smaller ions to pass through the upstream graphene sheet. This embodiment is suitable for use with systems in which the upstream sheet is charged to disallow the flow of chlorine and the downstream sheet is charged to disallow the flow of sodium. An embodiment in which the apertures in the upstream graphene sheet are smaller than the apertures in the downstream graphene sheet may also be possible. A more detailed description of a method and system for deionization or ion separating using graphene sheets with different aperture sizes is disclosed in U.S. patent application Ser. No. 12/868,150, which is fully incorporated by reference herein FIG. 8 is a simplified illustration of the structure of a backing sheet which may be used with the graphene sheet of FIG. 2. In FIG. 8, backing sheet 220a is made from filaments 820 of polytetrafluoroethylene, also known as polytetrafluoroethane, arranged in a rectangular grid and bonded or fused at their intersections. As with the perforated graphene sheet, the dimensions in the backing sheet should be as large as possible for maximum flow, commensurate with sufficient strength. The spacing between mutually adjacent filaments 820 oriented in the same direction can be nominally 100 nm, and the filaments may have a nominal diameter of 40 nm. The tensile strength of the graphene sheet is great, and so the relatively large unsupported areas in the backing sheet should not present problems.

Figure 9:
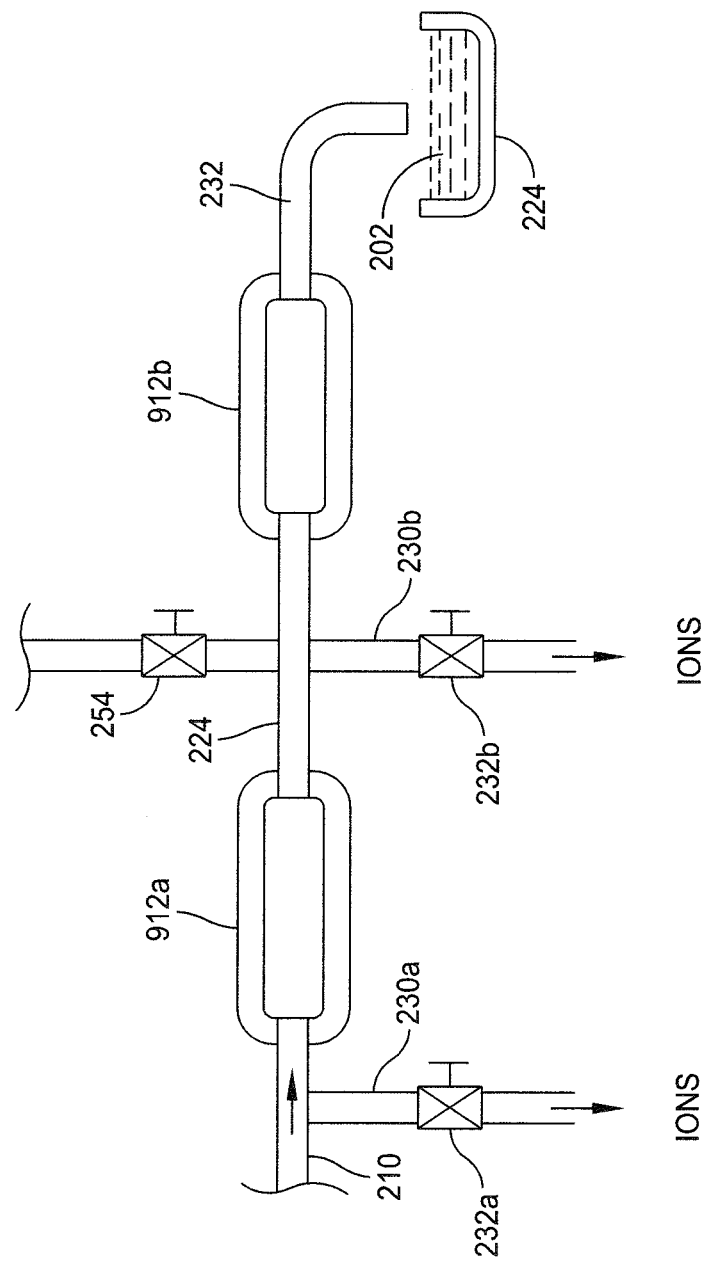
FIG. 9 is a simplified diagram illustrating a plumbing arrangement corresponding generally to the arrangement of FIG. 2, in which the perforated graphene sheets are spirally wound and enclosed in cylinders.

FIG. 9 is a simplified representation of a deionizing or ion separating arrangement according to an aspect of the disclosure. Elements of FIG. 9 corresponding to those of FIG. 2 are designated by like reference alphanumerics. In FIG. 8, the perforated graphene sheets 212a and 212b are rolled or spiral-wound into cylindrical form, and inserted into housings illustrated as 912a and 912b, respectively, as know from the RO membrane arts.

Those skilled in the art will understand that ions other than chlorine and sodium may be removed from water by charged graphene sheets.

A method for deionizing water (201) carrying unwanted ions comprises the steps of perforating a first sheet (212a) of graphene with plural apertures (312) and charging the sheet to repel certain ions (chlorine, for example) from transiting the apertures, and to attract water laden with selected second one of the unwanted ions (sodium, for example) to transit the apertures. A second sheet of graphene (212b) is perforated with plural apertures selected to allow the transit of water molecules and charged to repel the transit of selected second one of the unwanted ions though the apertures. The first sheet (212a) is placed downstream to the input (i.e., the direction of flow is from the input to the first sheet, therefore the first sheet is downstream from the input) and the second sheet (212b) is placed between the first sheet and the output (the second sheet is downstream from the first sheet, and the output is downstream from the second sheet). The water carrying unwanted ions is applied to the first side (212a) of the first sheet, so that water molecules flow from the input to the first sheet (212a) and the path (629) to the second sheet (212b), to thereby produce nominally deionized water in chamber 227a. The nominally deionized water molecules are collected from the second side (212b) of the second sheet. In a particular embodiment of this deionizer, a purge arrangement is coupled to the sheets for purging sheets 212a and 212b of ions. The purge arrangement includes purging valves 632a and 632b and collecting vessels 636A and 636B. Deionized water from tank 224 may be routed to the flow valves 256A and 256B for use in purging the ions from the sheets.

What is claimed is:

1. A method for deionizing water carrying ions, said method comprising the steps of:
   providing a first graphene sheet with first apertures dimensioned to allow flow of water molecules;
   providing a second graphene sheet with second apertures dimensioned to allow flow of water molecules;
   positioning the first graphene sheet downstream to a water flow path input and positioning the second graphene sheet between the first graphene sheet and a water flow path output;
   applying a first electrical charge to the first graphene sheet and a second electrical charge to the second graphene sheet, thereby causing the first graphene sheet to repel first ions of the first electrical charge from transiting the first apertures, the repelled first ions influencing second ions of the second electrical charge to not transit the first apertures, and causing the second graphene sheet to repel second ions from transiting the second apertures, the repelled second ions influencing the first ions to not transit the second apertures;
   causing water to enter the water flow path input, through said first graphene sheet and then through said second graphene sheet, thereby resulting in the first ions and the second ions accumulating between the water flow path input and the first graphene sheet, second ions accumulating between the first graphene sheet and the second graphene sheet, and deionized water at the water flow path output;
   monitoring an ion density of the first graphene sheet and the second graphene sheet; and
   when the ion density exceeds a threshold level, purging the first ions and the second ions.

2. The method of claim 1, wherein applying the first electrical charge and applying the second electrical charge comprises applying a differential DC voltage across the first graphene sheet and the second graphene sheet.

3. The method of claim 1, wherein applying the first electrical charge and applying the second electrical charge comprises applying an AC signal with a DC bias across the first graphene sheet and the second graphene sheet.

4. The method of claim 1, wherein the first electrical charge is a positive charge and the second electrical charge is a negative charge.

5. The method of claim 1, wherein the first electrical charge is a negative charge and the second electrical charge is a positive charge.

6. The method of claim 1, further comprising temporarily de-applying the first electrical charge on the first graphene sheet and the second electrical charge on the second graphene sheet during purging of the first ions and purging the second ions.

7. The method of claim 6, further comprising collecting the purged first ions and the purged second ions.

8. The method of claim 1, wherein monitoring the ion density comprises monitoring capacitance across the first graphene sheet and the second graphene sheet.

9. The method of claim 1, further comprising
   dimensioning the first apertures of the first graphene sheet to disallow transit of ions of the first electrical charge through the first apertures; and
   dimensioning the second apertures of the second graphene sheet to disallow transit of ions of the second electrical charge through the second apertures.

10. The method of claim 1, further comprising
    dimensioning the first apertures of the first graphene sheet to disallow transit of ions of the first electrical charge through the first apertures; and
    dimensioning the second apertures of the second graphene sheet to disallow transit of ions of the second electrical charge through the second apertures.

11. The method of claim 1, wherein providing a first graphene sheet with first apertures dimensioned to allow flow of water molecules comprises providing a first graphene sheet with a plurality of first apertures spaced at a 15 nm center-to-center nominal spacing; and
    wherein providing a second graphene sheet with second apertures dimensioned to allow flow of water molecules comprises providing a second graphene sheet with a plurality of second apertures spaced at a 15 nm center-to-center nominal spacing.

12. The method of claim 1, wherein providing a first graphene sheet with first apertures dimensioned to allow flow of water molecules comprises providing a first graphene sheet with first apertures having a nominal diameter between 1.3 nm and 2.0 nm; and
    wherein providing a second graphene sheet with second apertures dimensioned to allow flow of water molecules comprises providing a second graphene sheet with second apertures having a nominal diameter of 1.3 nm.

13. A water deionizer, comprising:
    a first graphene sheet with first apertures dimensioned to allow the flow of water molecules and disallow transit of ions of a first electrical charge;
    a second graphene sheet with second apertures dimensioned to allow the flow of water molecules and disallow transit of ions of a second electrical charge;
    a water flow path having an input and an output, wherein the first graphene sheet is positioned downstream the water flow path input and the second graphene sheet is positioned between the first graphene sheet and the water flow path output;
    a source of water laden with ions; and
    a voltage source for applying the first electrical charge to the first graphene sheet and the second electrical charge to the second graphene sheet;
    wherein the water laden with ions introduced into the water flow path input flows to the first graphene sheet which repels first ions of the first electrical charge from transiting the first apertures, the non-transiting first ions influencing second ions of the second electrical charge to also not transit the first apertures, then flows to the second graphene sheet which repels the second ions of the second electrical charge from transiting the second apertures, the non-transiting second ions influencing the first ions to also not transit the second apertures, thereby resulting in the first ions and the second ions accumulating between the water flow path input and the first graphene sheet, the first ions and the second ions accumulating between the first graphene sheet and the second graphene sheet, and deionized water at the water flow path output.

14. The deionizer of claim 13, wherein the voltage source applies a differential DC voltage across the first graphene sheet and the second graphene sheet, thereby applying a first electrical charge to the first graphene sheet and a second electrical charge to the second graphene sheet.

15. The deionizer of claim 13, wherein the voltage source applies an AC signal with a DC bias across the first graphene sheet and the second graphene sheet, thereby applying a first electrical charge to the first graphene sheet and a second electrical charge to the second graphene sheet.

16. The deionizer of claim 13, wherein the first electrical charge is a positive charge and the second electrical charge is a negative charge.

17. The deionizer of claim 13, wherein the first electrical charge is a negative charge and the second electrical charge is a positive charge.

18. The deionizer of claim 13, further comprising:
- a resistor electrically coupled in series with the first graphene sheet and the second graphene sheet;
- a sensor for monitoring an electrical signal across the resistor, the electrical signal being indicative of an ion density on the first graphene sheet and the second graphene sheet; and
- a pump for purging the first ions and the second ions when the ion density exceeds a threshold level.

19. The water deionizer of claim 18, further comprising a processor electrically coupled to the sensor and the pump, wherein the processor causes the pump to purge the first ions and the second ions when the ion density of the first graphene sheet and the second graphene sheet exceeds the threshold level.

20. The deionizer of claim 19, further comprising an electrical relay electrically coupled to the processor and the voltage source, wherein the processor opens the electrical relay, thereby disconnecting the voltage source from the first graphene sheet and the second graphene sheet, during purging.

21. The deionizer of claim 20, further comprising an ion reclamation tank for receiving the purged first ions and second ions.

22. The deionizer of claim 21, further comprising an input valve on the water flow path input, an output valve on the water flow path output, a first pump valve coupling the pump to a first chamber between the water flow path input and the first graphene sheet, a second pump valve coupling the pump to a second chamber between the first graphene sheet and the second graphene sheet, a first ion reclamation tank valve and a second ion reclamation tank valve,
- wherein, to deionize water, the processor causes an actuator to open the input valve and the output valve and close the first pump valve, the second pump valve, the first ion reclamation tank valve, and the second ion reclamation tank valve;
- wherein, to purge the first chamber, the processor causes the actuator to close the input valve, the output valve, the second pump valve, and the second ion reclamation tank valve, and open the first pump valve and the first ion reclamation tank valve; and
- wherein, to purge the second chamber, the processor causes the actuator to close the input valve, the output valve, the first pump valve, and the first ion reclamation tank valve, and open the second pump valve and the second ion reclamation tank valve.

* * * * *